(12) United States Patent
Holleschau et al.

(10) Patent No.: US 10,938,194 B1
(45) Date of Patent: Mar. 2, 2021

(54) ELECTRICAL GANG BOX WITH DRIVER COMPARTMENT

(71) Applicant: Elemental LED, Inc., Reno, NV (US)

(72) Inventors: Randall Holleschau, Reno, NV (US); Matthew John, Reno, NV (US)

(73) Assignee: Elemental LED, Inc., Reno, NV (US)

( * ) Notice: Subject to any disclaimer, the term of this patent is extended or adjusted under 35 U.S.C. 154(b) by 0 days.

(21) Appl. No.: 17/087,327

(22) Filed: Nov. 2, 2020

(51) Int. Cl.
- *H02G 3/08* (2006.01)
- *H02G 3/38* (2006.01)
- *H05B 45/37* (2020.01)

(52) U.S. Cl.
CPC ............ *H02G 3/286* (2013.01); *H02G 3/083* (2013.01); *H05B 45/37* (2020.01)

(58) Field of Classification Search
USPC .......................................................... 174/50
See application file for complete search history.

(56) References Cited

U.S. PATENT DOCUMENTS

| | | | | |
|---|---|---|---|---|
| 3,690,501 A * | 9/1972 | Ware | ...................... | H02G 3/086 220/3.94 |
| 4,304,957 A * | 12/1981 | Slater | ..................... | H02G 3/123 174/58 |
| 4,612,412 A * | 9/1986 | Johnston | ................ | H02G 3/086 174/57 |
| 5,445,539 A * | 8/1995 | Dale | ...................... | H02G 3/083 174/53 |
| 5,486,650 A * | 1/1996 | Yetter | ...................... | H02G 3/10 174/53 |
| 5,594,207 A * | 1/1997 | Fabian | .................... | H02G 3/086 174/53 |
| 5,596,174 A * | 1/1997 | Sapienza | ................ | H02G 3/086 174/53 |
| 6,091,023 A * | 7/2000 | O'Donnell | ............. | H02G 3/086 174/57 |
| 6,414,241 B1 | 7/2002 | O'Donnell | | |
| 6,566,600 B1 * | 5/2003 | Ford | ...................... | H02G 3/086 174/50 |
| 6,576,835 B1 * | 6/2003 | Ford | ...................... | H02G 3/086 174/135 |

(Continued)

OTHER PUBLICATIONS

Elemental LED, Inc. "SWITCHEX® Dimmer + Driver: Installation Guide." Version of Apr. 19, 2017.

*Primary Examiner* — William H. Mayo, III
*Assistant Examiner* — Krystal Robinson
(74) *Attorney, Agent, or Firm* — United IP Counselors, LLC

(57) ABSTRACT

An electrical gang box adapted for use with drivers is disclosed. The electrical gang box includes a main compartment with a front opening sized and adapted to accept an electrical control and structure around the front opening to secure the electrical control within the front opening and within the main compartment. The electrical gang box also includes a lower compartment that extends below the main compartment, is set back from the front of the main compartment and is open to the main compartment along an upper portion. The gang box may also include one or more pairs of rails disposed on opposite interior walls. In such cases, a divider panel is sized to slide into and extend between the rails to divide the junction box. Multiple-gang boxes with these features are also disclosed.

21 Claims, 6 Drawing Sheets

(56) References Cited

U.S. PATENT DOCUMENTS

| | | | | |
|---|---|---|---|---|
| 7,214,875 B1* | 5/2007 | Gretz | ............. | H02G 3/086 |
| | | | | 174/481 |
| 7,439,442 B2* | 10/2008 | Schutte | ............. | F21V 15/01 |
| | | | | 174/50 |
| 7,525,043 B1* | 4/2009 | Gretz | ............. | H02G 3/123 |
| | | | | 174/50 |
| 7,659,478 B2* | 2/2010 | Schlachter | ............. | H02G 3/086 |
| | | | | 174/58 |
| 7,905,621 B1* | 3/2011 | Hickman | ............. | F21S 8/022 |
| | | | | 362/153.1 |
| 7,910,826 B1* | 3/2011 | Shotey | ............. | H02G 3/126 |
| | | | | 174/50 |
| 8,273,998 B2* | 9/2012 | Drane | ............. | H01R 24/78 |
| | | | | 174/484 |
| 8,389,855 B2* | 3/2013 | Plankell | ............. | H02G 3/086 |
| | | | | 174/50 |
| 8,436,259 B2* | 5/2013 | Green | ............. | H02G 3/081 |
| | | | | 174/520 |
| 8,446,737 B1* | 5/2013 | Tschirpke | ............. | H04R 1/025 |
| | | | | 361/796 |
| 8,710,367 B2* | 4/2014 | Korcz | ............. | H02G 3/086 |
| | | | | 174/53 |
| 8,739,997 B1* | 6/2014 | Ploof | ............. | H02G 3/14 |
| | | | | 220/3.8 |
| 9,148,007 B2* | 9/2015 | Drane | ............. | H02G 3/185 |
| 9,667,053 B2* | 5/2017 | Wurms | ............. | H02G 3/383 |
| 9,788,374 B1* | 10/2017 | Holleschau | ............. | H02G 3/08 |
| 9,966,746 B1* | 5/2018 | Ediger | ............. | H02G 3/126 |
| 10,622,794 B1* | 4/2020 | Holleschau | ............. | H01H 9/0044 |
| 10,855,065 B1* | 12/2020 | Lassen | ............. | H02G 3/085 |
| 2002/0117317 A1* | 8/2002 | Archer | ............. | H02G 3/086 |
| | | | | 174/50 |
| 2003/0056964 A1* | 3/2003 | Lalancette | ............. | H02G 3/081 |
| | | | | 174/50 |
| 2003/0089710 A1* | 5/2003 | Gates, II | ............. | H01R 25/006 |
| | | | | 220/3.92 |
| 2009/0218128 A1* | 9/2009 | Carbone | ............. | H02G 3/0493 |
| | | | | 174/486 |
| 2012/0262006 A1* | 10/2012 | Elberbaum | ............. | H02G 3/12 |
| | | | | 307/112 |
| 2014/0090863 A1* | 4/2014 | Korcz | ............. | H02G 3/12 |
| | | | | 174/50 |
| 2016/0359305 A1* | 12/2016 | Hemingway | ............. | H05K 5/0226 |
| 2018/0054050 A1* | 2/2018 | Thomas | ............. | H02G 3/185 |
| 2020/0203899 A1* | 6/2020 | Carter, III | ............. | H01R 13/745 |
| 2020/0370750 A1* | 11/2020 | Hoagland | ............. | F23Q 1/02 |

\* cited by examiner

ELECTRICAL GANG BOX WITH DRIVER COMPARTMENT

TECHNICAL FIELD

The invention relates to enclosures for electrical components, and in particular, to an electrical enclosure with a driver compartment.

BACKGROUND

A driver is a component that takes power in a first form and outputs power in a second form, different from the first. Ubiquitous in modern consumer electronics, drivers are most frequently used to convert high-voltage, alternating-current (AC) power to low-voltage, direct-current (DC) power, although AC-to-AC, DC-to-DC, and other forms of power conversion are also sometimes seen. The switched-mode power supply is one common type of driver used for AC-to-DC power conversion, but other types of drivers are also used.

Drivers are unloved. Referred to derisively as bricks, wall worts, and worse, they can be inconvenient to install and to use. For example, during the installation of a low-voltage DC electrical product like linear lighting, the installer must plan out how much power each part of the system requires, find compatible drivers, and provide space to install those drivers at appropriate locations. Installers are required to be ever more creative with their placement of drivers, and if the power utilization calculations for the system are off, the installer may need to remove and replace the drivers with different models, at significant expense. Drivers also frequently fail, and replacement after installation may mean tearing holes in drywall, opening barely-accessible raceways and compartments, or otherwise undoing whatever creative contortions the installer went through to install the drivers in the first place.

In many installations, it would be logical to place a driver in the same enclosure in which typical electrical control elements are placed. In typical household and commercial construction, control elements like switches and dimmers are placed in electrical enclosures called gang boxes. These gang boxes are usually nailed, screwed, or otherwise secured to the joists or other support beams of the structure and are then covered by drywall or other such wall sheathing. There are two main problems with placing a driver in a gang box: first, finding space in a typical gang box for a driver is difficult, and, second, electrical codes and regulations may require high-voltage circuits to be separated from low-voltage circuits, which adds a degree of complexity.

The present assignee has put forward several solutions to the problem of placing a driver in a gang box. U.S. Pat. No. 9,788,374 uses a gang box with multiple compartments and places the switch or dimmer in one compartment and the driver in another compartment, using dividers as necessary. The driver is usually covered with either a blank or a dummy fascial plate. Although the solution put forward by this patent uses off-the-shelf components, a multiple-gang box requires more space, using a compartment for the driver may take up space needed for a switch or dimmer, and a blank plate or a dummy control may confuse the end user.

U.S. Pat. No. 10,622,794 proposes a different solution: providing holes or knock-outs in a traditional gang box that would allow a driver to be "hung" from the gang box in various places. While this conserves space by, essentially, placing the driver in unused space below or behind the gang box, it does have some shortcomings. First, with the arrangement proposed by this patent, special mounting brackets and, in some cases, specially adapted drivers are used. Additionally, as electrical enclosures, one of the main practical purposes of gang boxes is to provide fire protection—i.e., to contain sparks and flame in case of electrical arcing, a short, or another such situation. Because the driver is hung from the gang box, the gang box may not be able to provide sufficient fire protection to meet regulatory requirements.

BRIEF SUMMARY

One aspect of the invention relates to an electrical gang box adapted for use with drivers. The electrical gang box includes a main compartment with a front opening sized and adapted to accept an electrical control and structure around the front opening to secure the electrical control within the front opening and within the main compartment. The electrical gang box also includes a lower compartment that extends below the main compartment, is set back from the front of the main compartment and is open to the main compartment along an upper portion. The gang box may also include one or more pairs of rails disposed on opposite interior walls. In such cases, a divider panel is sized to slide into and extend between the rails to divide the junction box. Several pairs of rails may be provided to allow for alternative positions for the divider panel. The divider panel itself may have a number of frangible score lines, dividing it into sections which can be broken off to adjust for the depth of the electrical control.

The gang box typically has one or more openings, or potential openings, to allow for the passage of wires and cables into and out of the gang box. In some embodiments, the potential openings may be flaps that deflect to allow passage of wires and cables, but provide strain relief for those wires and cables.

Another aspect of the invention relates to multi-gang boxes. These multi-gang boxes have several compartments for electrical controls. In embodiments according to this aspect of the invention, the main portion of the junction box is divided by vertically-extending dividers into two or more main compartments, each of the two or more main compartments sized to accept a standard electrical control. These multi-gang boxes also include a lower portion. The dividers may extend down into the lower portion to divide the lower portion into multiple corresponding lower compartments as well, or the lower portion may remain undivided, extending across several of the two or more main compartments. Each of the main compartments has the features described above, including rails and a horizontally-extending divider panel that can be used to separate high-voltage circuits and connections from low-voltage circuits and connections.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the description, and in which.

DETAILED DESCRIPTION

Figure 1:
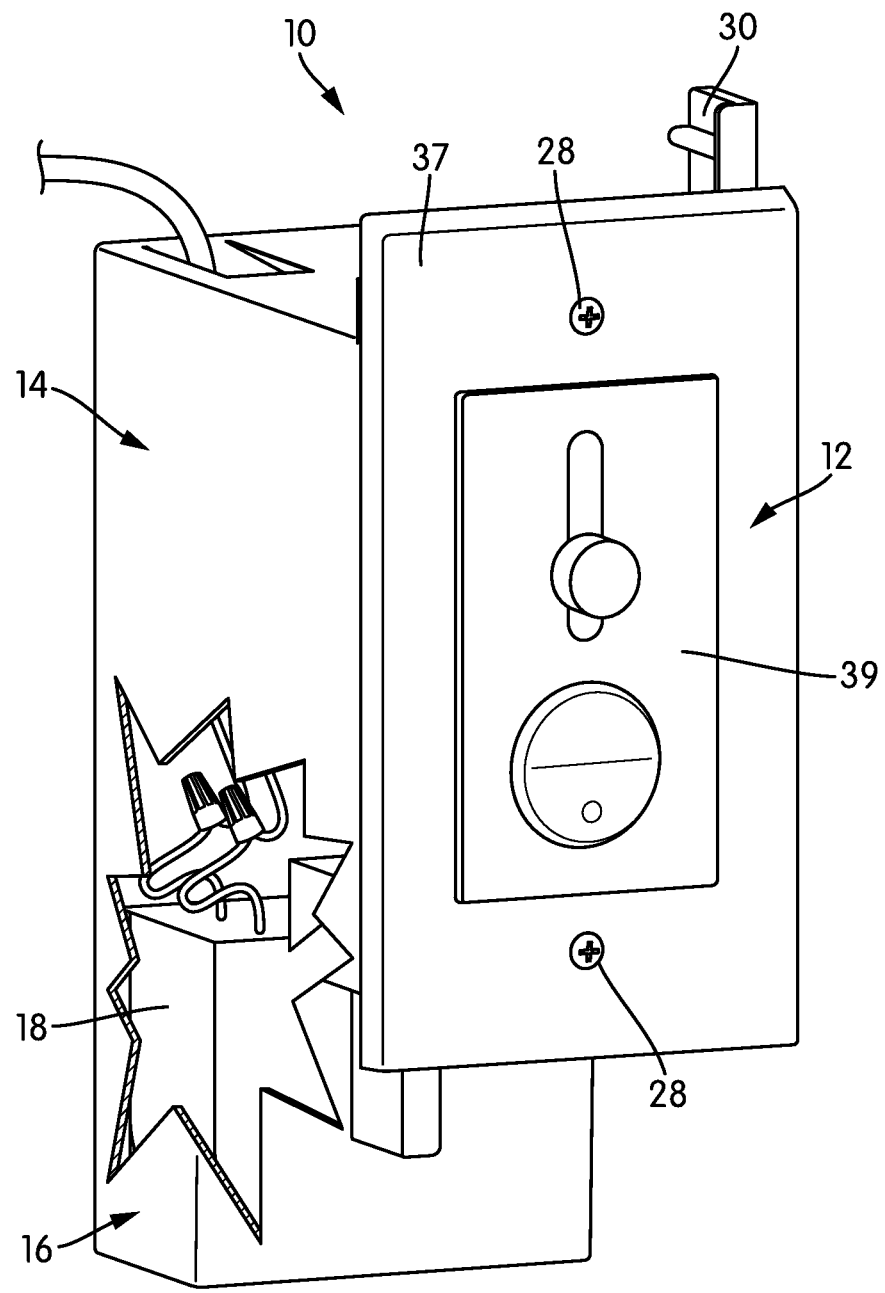
FIG. 1 is a perspective view of a gang box according to one embodiment of the invention, shown assembled with an electrical control.

FIG. 1 is a perspective view of a gang box, generally indicated at 10, according to one embodiment of the invention. The gang box 10 is shown with an electrical control 12 installed in its main compartment 14. The gang box 10 also has a driver compartment 16, which, in this case, lies below and depends from the main compartment 14 and, as shown, has a driver 18 installed in it.

The gang box 10 shares at least some of the features of a typical electrical gang box, in that it is an enclosure with a front opening. As can be seen in FIG. 1 and in FIG. 2, a similar perspective view with the electrical control 12 removed, the gang box 10 has structure typical of a standard gang box that allows it to be attached to joists and other such structure. In the illustrated embodiment, this includes pairs of upper and lower flanges 20 along the front of the gang box 10, around the opening 22 to the main compartment 14. Each of the upper and lower flanges 20 carries a fastener hole 24. Set closer to the front opening 22 and located along the vertical centerline of the opening 22 are a pair of upper and lower receptacles 26 that, as can be seen best in FIG. 1, are adapted to receive a fastener 28 to secure the electrical control 12 within the main compartment 14 of the gang box 10. Additionally, there is a paddle 30 in the illustrated embodiment that allows the gang box 10 to grip the reverse side of a sheet of drywall. Of course, these features may vary from embodiment to embodiment; generally speaking, the gang box 10 may be installed anywhere, and may have any features that enable it to be installed anywhere. In particular, gang boxes 10 according to embodiments of the invention may be designed in two varieties: one for installation during new construction, and a second version for retrofitting. Some features, like the paddle 30, work best in retrofit versions, while other features work best or are most common in new-construction versions.

Figure 2:
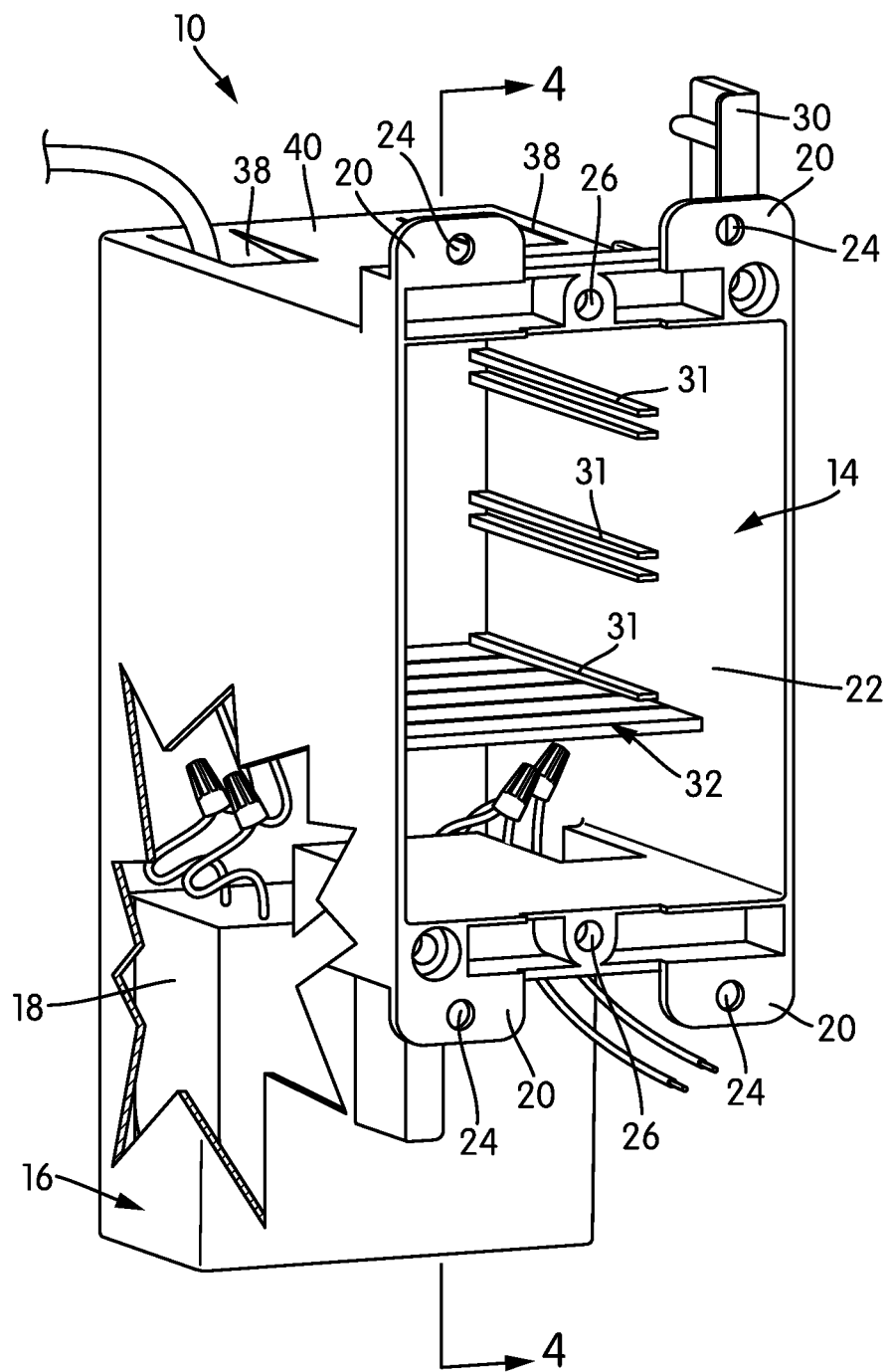
FIG. 2 is a perspective view of the gang box of FIG. 1 with the electrical control removed.
Figure 3:
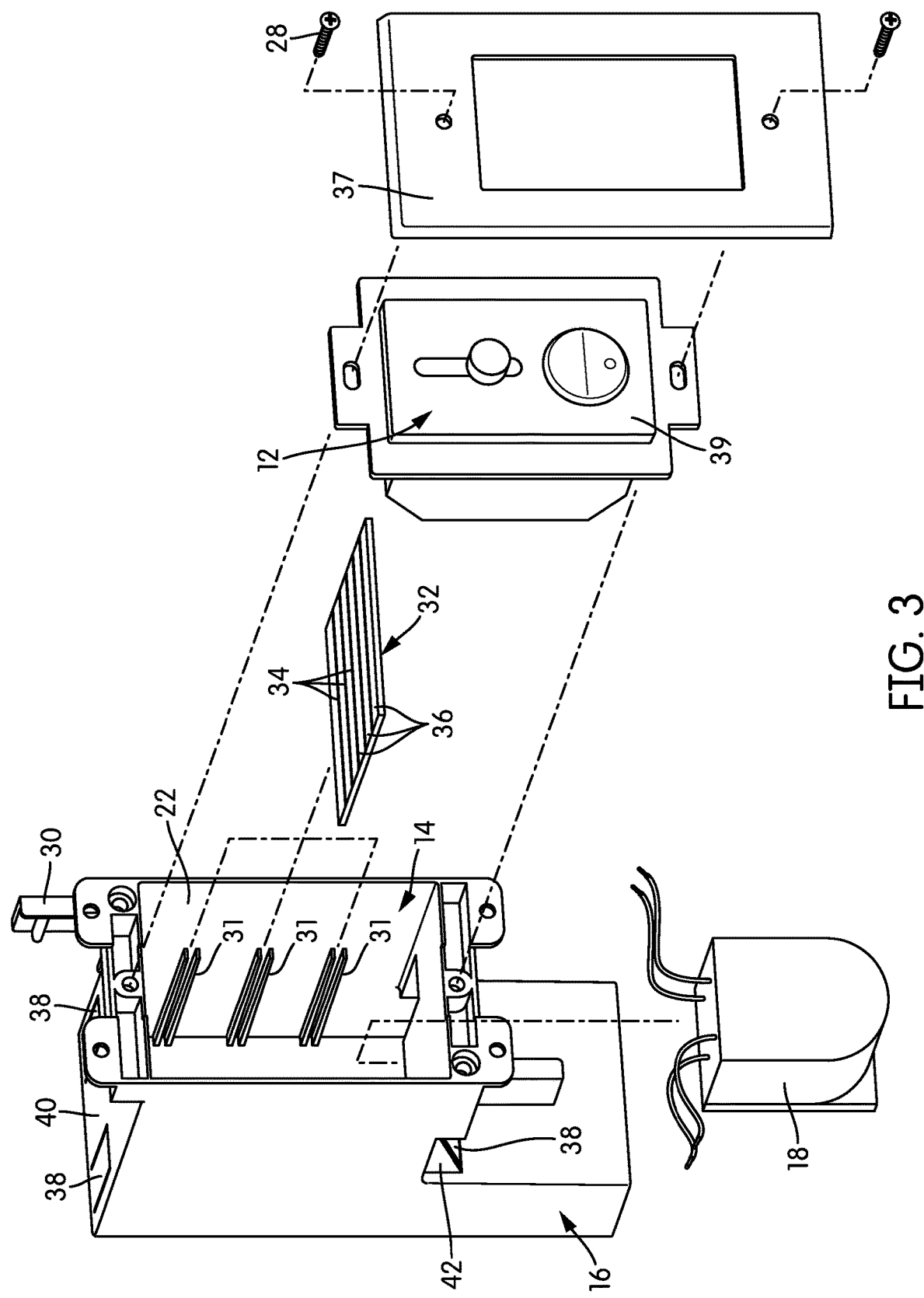
FIG. 3 is an exploded perspective view of the gang box of FIG. 1.

FIG. 3 is an exploded perspective view of the gang box 10. As shown in FIGS. 2 and 3, the main compartment 14 has the size and other characteristics to accept a standard-sized electrical control 12. The term "electrical control," as used here, should be read broadly to encompass any element that may be placed in a gang box 10, including switches, dimmers, and other such elements. Typically, but not always, these components will take high-voltage AC power as input and output a high-voltage AC power signal. (While the definitions of "high voltage" and low voltage" vary according to the authority one consults, for purposes of this description, high voltage should be considered to be any voltage over 50V.) In these sorts of arrangements, some further element is typically necessary to provide an appropriate power or control signal for low-voltage linear lighting and other such low-voltage products found in a home or business. In this description, that further element is referred to as a driver 18, although in some embodiments or installations, the further element may be something else, such as a color controller, a network interface, or some other element. Thus the term "driver," as used here, should be read broadly to encompass other elements that may be placed in a gang box 10 but that are not, strictly speaking, drivers.

The main compartment 14 may vary in depth, and gang boxes 10 with deeper and shallower compartments may be made. In addition to the usual features of a gang box, the main compartment 14 has a series of rails 31. In the illustrated embodiment, there are three sets of rails on each of the left and right sidewalls of the main compartment 14, positioned so as to align with and oppose one another. In other embodiments, there may be any number of sets of rails 31, spaced from one another along the walls. The rails 31 define insertion positions for a divider 32 that slides horizontally into the rails 31 behind the electrical control 12, dividing the main compartment 14 vertically into an upper portion and a lower portion.

As was described briefly above, regulatory requirements or the desire for additional protection against sparks, electrical arcs, and other such potential issues may make it desirable to separate high-voltage connections from low-voltage connections. If so, the divider 32 may be used to provide the necessary division. The divider 32 has a number of frangible lines 34 that allow strips 36 to be broken off of the divider 32 to adjust its depth, so that it does not interfere with the electrical control 12. In other words, if the electrical control 12 is relatively shallow and does not extend far into the gang box 10, the divider 32 may be used at its full depth. On the other hand, if the electrical control 12 has significant depth, it may be necessary to break off one or more of the strips 36 in order to fit everything.

In the illustrated embodiment, the driver compartment 16 is located below the main compartment 14, set somewhat back from its main opening 22. While the exact positioning of the driver compartment 16 may vary somewhat from embodiment to embodiment, it is helpful if the positioning of the driver compartment 16 allows drywall or other such wall finishing elements to be installed over the gang box 10 as usual. In this embodiment, the width of the driver compartment 16 matches the width of the main compartment 14, such that the sidewalls of the main compartment 14 are contiguous with the sidewalls of the driver compartment 16, although that need not be the case in all embodiments. The depth of the driver compartment 16 is about one-third of the depth of the main compartment 14, and the height of the driver compartment 16 is about three-quarters of the height of the main compartment 14, although these proportions may vary considerably from embodiment to embodiment.

The driver compartment 16 is open to the main compartment 14 along its upper extent, such that, in many cases, the driver 18 can simply be dropped into the driver compartment 16 and held there by the force of gravity, as shown in FIG. 3. With the driver 18 in that position, connections may be made in the main compartment 14, in the driver compartment 16, or in both.

As FIG. 3 also illustrates, to complete the assembly, a traditional switch plate 37 rests over the electrical control 12 and is secured to the gang box 10 with a fastener 28, typically a machine screw, as described above. In the illustrated embodiment, the electrical control 12 has fascial plate 39 with controls that are operable by a user after installation. The color and other aesthetic characteristics of the fascial plate 39 would typically match those of the switch plate 37.

The manner of making connections between the electrical control 12 will vary depending on the nature of the electrical control 12 and the driver 18, the connections provided by the electrical control 12 and the driver 18, and the applicable safety or regulatory requirements. In many cases, both the electrical control 12 and the driver 18 will have input and output wires protruding from their cases. In that case, connections with other conductors may be made with traditional electrical connection devices, such as wire nuts or lever nuts.

The gang box 10 typically has some sort of openings or potential openings to permit the passage of cables and wires into and out of the gang box 10. In some embodiments, those openings may be created by knock-outs, i.e., scored, frangible portions of plastic or metal that can be broken away, either manually or with a tool, to create an opening. However, the illustrated embodiment takes a slightly different approach, using sets of fold-out flaps 38, two flaps 38 on the upper face 40 of the gang box 10, and two flaps 38 on an angled facet 42 near the junction between the main compartment 14 and the driver compartment 16. These flaps 38 are rectilinear, free on three sides and connected to the rest of the gang box 10 on the remaining side. In some cases, three sides may be scored, frangible lines, and the flaps 38 may be broken out in same way as knock-outs. The advantage of fold-out flaps 38 can be seen in FIGS, 1 and 2: the flaps 38 act as strain relief for incoming and outgoing wires and cables 44, 46, partially capturing them as they pass through the gang box 10. The wires, cables, and other conductors used with the gang box 10 may be of any type customarily used. For example, in many in-wall applications, Type NM cable may be suitable.

Figure 4:
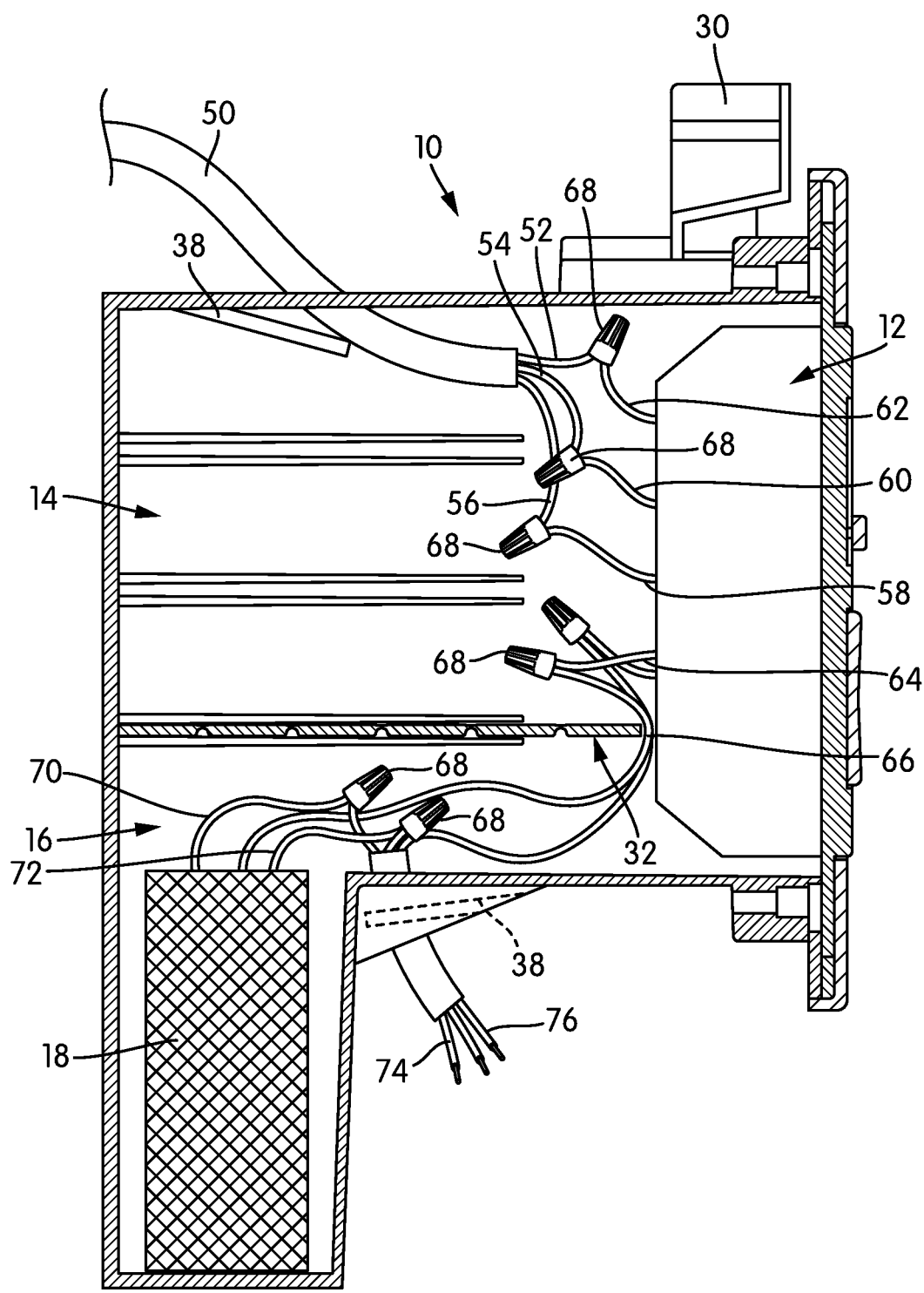
FIG. 4 is a cross-sectional view, taken through Line 4-4 of FIG. 1.

FIG. 4 is a cross-sectional view taken through Line 4-4 of FIG. 2, illustrating a typical way in which connections may be made within the gang box 10. In FIG. 4, a high-voltage cable 50 enters the gang box 10 through one of the flaps 38 in its upper wall. A typical high-voltage cable 50 includes three conductors 52, 54, 56, usually arranged as line, neutral, and ground. In the upper portion of the main compartment 14, divided by the divider 32, these three conductors 52, 54, 56 from the cable 50 are connected to respective input conductors 58, 60, 62 from the case of the electrical control 12. In the same upper portion of the main compartment 14, high-voltage output wires 64 from the electrical control 12 are connected to high-voltage input wires 66 from the driver 18. In the view of FIG. 4, only one of the output-input wire sets 64, 66 is shown for the sake of simplicity; typically, there would be two or three sets. In the illustration of FIG. 4, all of the connections between wires are made with wire nuts 68, although other connecting elements may be used. Low voltage DC output wires 70, 72 from the driver 18 are connected to wires 74, 76 that exit the gang box 10 through one of the lower flaps 38. Of course, the low-voltage wires 70, 72 may also be part of a cable.

Of course, the illustration of FIG. 4 is only one possible way in which the electrical control 12 may be connected to the driver 18, and assumes that the electrical control 12 works with high-voltage AC and the driver 18 converts from high-voltage AC to low-voltage DC. In fact, there may be installations in which the driver 18 in the driver compartment 16 and the electrical control 12 are not electrically connected to one another. That is, there may be situations in which an installer may wish to place a driver 18 in the driver compartment 16 merely as a matter of placement, without needing to connect the driver 18 and the electrical control 12.

FIGS. 1-4 illustrate what would be referred to in the industry as a single-gang box. Multiple-gang boxes may also be made in accordance with embodiments of the invention. Generally speaking, multiple-gang boxes have multiple compartments for individual electrical controls 12. They are particularly useful when a bank or strip of electrical controls are to be located next to one another. The most common multiple-gang boxes are so-called two-gang (i.e., two compartment) and three-gang (i.e., three compartment) boxes, although four-gang and five-gang boxes may also be made.

Figure 5:
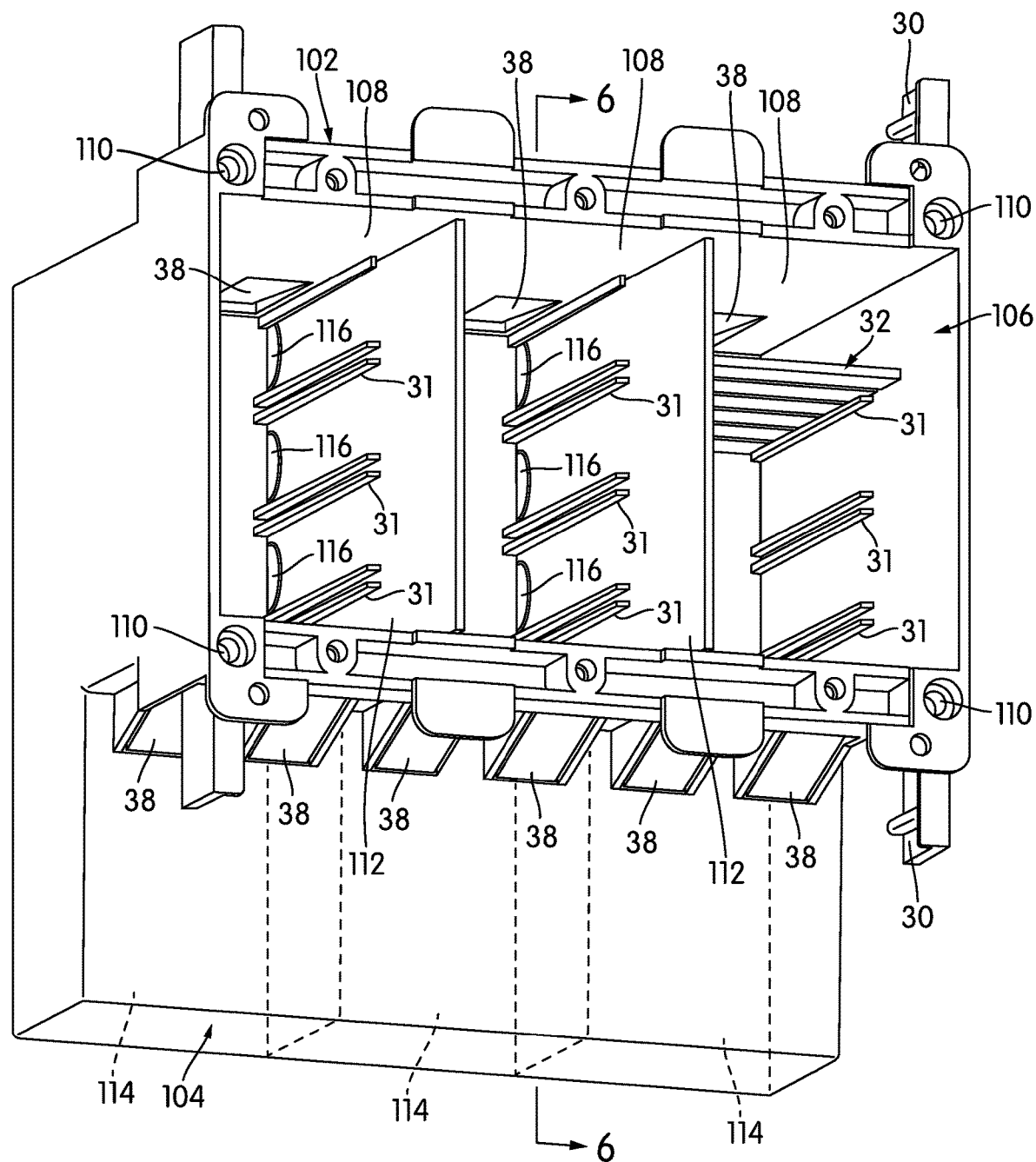
FIG. 5 is a perspective view of a multiple-gang box according to another embodiment of the invention.

FIG. 5 is a perspective view of a three-gang box, generally indicated at 100, according to another embodiment of the invention. The three-gang box 100 is intended to be a representative example of multiple-gang boxes, and in general, multiple gang boxes with more or fewer than three compartments would be constructed in substantially the same way.

The three-gang box 100 has a main portion 102 and a driver portion 104. As with the gang box 10 described above, the driver portion 104 is below and depends from the main portion 102. The main portion 102 has a large front opening 106 that is divided into three compartments 108, as will be described below in more detail. Around the front opening 106 and the top and bottom walls of the main portion 102, the three-gang box 100 carries mounting structure to secure it to joists and other such structures. For example, each corner around the front opening 106 has a fastener hole 110. The structures of the multiple-gang box 100 are the same or substantially the same as those described above with respect to the gang box 10; thus, features not described specifically here may be assumed to be the same or substantially the same as those described above.

The three-gang box 100 has two vertical internal dividers 112 positioned within the main portion 102 to divide the main portion 102 into the three compartments 108. As is traditional in gang boxes, the three compartments 108 have equal sizes in the three gang box 100; however, that need not be the case in all embodiments. In the illustrated embodiment, the internal dividers 112 continue down into the driver portion 104, dividing the driver portion 104 into three compartments 114 of equal size. Each of the compartments 114 in the driver portion 104 corresponds with one of the compartments 108 in the main portion 102. However, in some cases, the driver portion 104 may be undivided, forming one long trough for drivers.

As with the gang box 10, each of the compartments 108 can be divided vertically by a horizontally-extending divider 32 in order to isolate high-voltage circuits from low-voltage circuits, as described above. The side walls of each compartment 108 carry multiple sets of rails 31, spaced from one another, to receive the divider 32. Specifically, as can be seen in FIG. 5, the dividers 112 each carry multiple, vertically-spaced sets of rails 31 on each side.

The multiple-gang box 100 has fold-in flaps 38 or other ingress-egress structures in the same relative positions as in the gang box 10 described above, positioned at the top and bottom of each compartment 108. These flaps 38 allow wires and cables to enter and leave the multiple-gang box 100. However, the multiple-gang box 100 also includes additional structure for allowing wires and cables to transit from one compartment to another.

Figure 6:
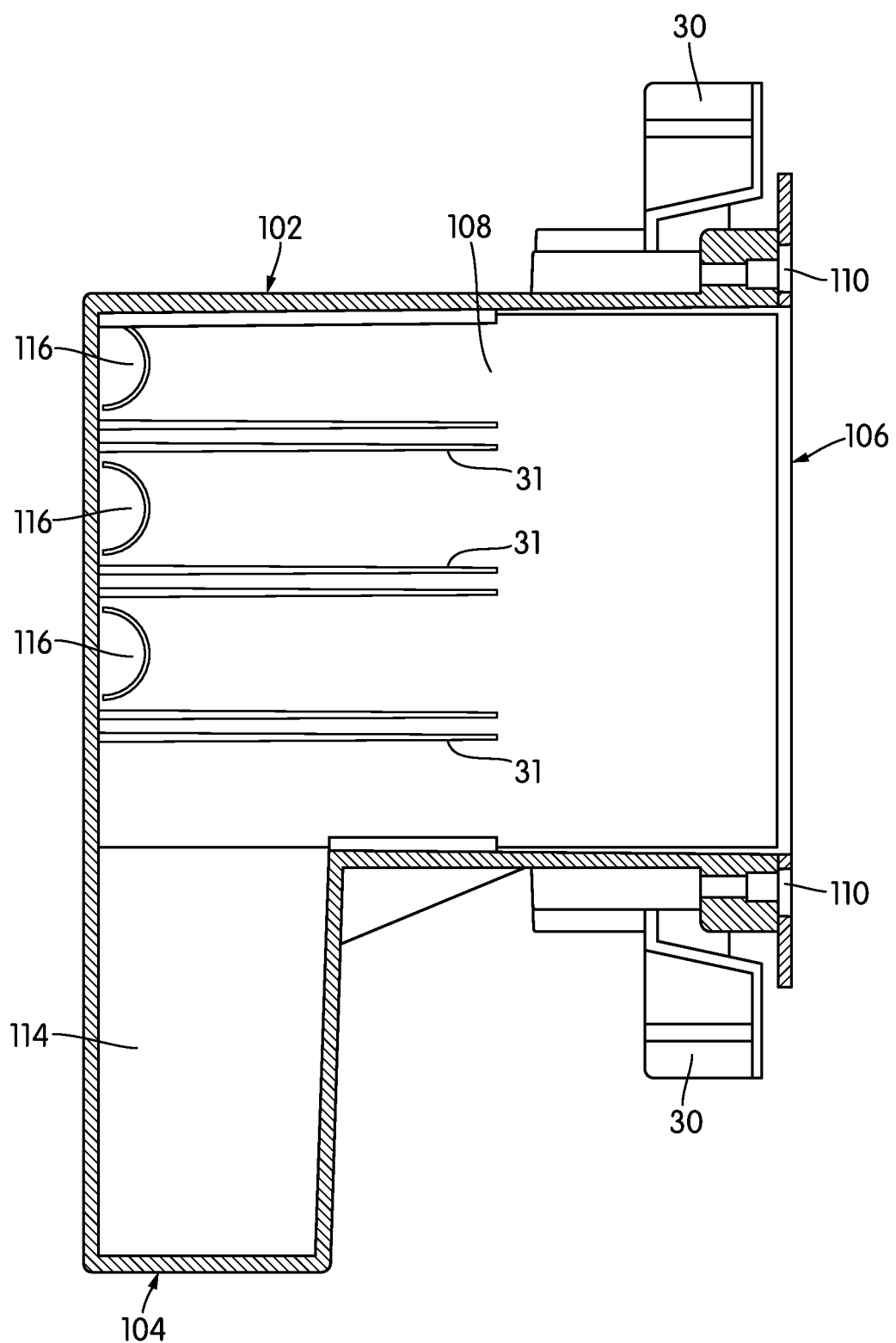
FIG. 6 is a cross-sectional view taken through Line 6-6 of FIG. 5.

More specifically, in a typical installation, a single high-voltage cable is brought into a multiple-gang box. Connections to that single cable are made within the multiple-gang box, and high-voltage power is thus distributed to all of the compartments from a single point of ingress. For that reason, as shown in FIG. 5 as well as in FIG. 6, a sectional view taken through Line 6-6 of FIG. 5, each of the dividers 112 has a set of tabs 116 that allow transit of wires or cables from one compartment 108 to the next. These tabs 116, which are in the rear of each divider 112, where the divider 112 meets the rear wall of the main portion 102, may be either knock-outs or flaps. In the illustrated embodiment, the tabs 116 are semicircular flaps.

As with the gang box 10 described above, the gang box 100 may be made in versions suitable for either retrofit or new construction, and with any kind of securing structure. The gang box 100 is a retrofit version and thus carries the paddles 30 described above.

Gang boxes 10, 100 according to embodiments of the invention may be made of a variety of materials, typically including metals and plastics. If a gang box 10 is made of a plastic, typically, the plastic will be adapted and rated to handle flames. For example, the plastic may be rated as 5 VA according to the UL 94 standard, which is harmonized with a number of international standards.

While the invention has been described with respect to certain embodiments, the description is intended to be exemplary, rather than limiting. Modifications and changes may be made within the scope of the invention, which is defined by the appended claims.

What is claimed is:

1. An electrical gang box, comprising:
    a main compartment having a front, a back, and a rectilinear front opening at the front, the main compartment being sized and adapted to accept an electrical control;
    first securing structure around the front opening and facing the front, the securing structure adapted to secure the electrical control in the main compartment;
    a lower compartment extending below the main compartment and set back from the front of the main compartment, the lower compartment open to the main compartment along an upper extent thereof;
    at least one pair of rails disposed on opposite interior walls of the main compartment above and separate from a bottom of the main compartment, oriented to extend horizontally along a depth of the main compartment; and
    a divider panel sized to slide into and extend between the at least one pair of rails, the divider panel having a depth that is less than the depth of the main compartment.

2. The electrical gang box of claim 1, wherein the divider panel is divided by frangible score lines into two or more sections.

3. The electrical gang box of claim 1, wherein the at least one pair of rails comprises two or more pairs of rails, the two or more pairs of rails spaced from one another along the opposite interior walls of the main compartment.

4. The electrical gang box of claim 1, further comprising second securing structure along an exterior surface of the gang box, the second securing structure adapted to secure the gang box to an exterior structure.

5. The electrical gang box of claim 1, further comprising openings or potential openings.

6. The electrical gang box of claim 5, wherein the potential openings comprise flaps in walls of the main compartment that deflect to provide the openings.

7. The electrical gang box of claim 6, wherein the flaps provide strain relief for passing wires or cables.

8. An electrical gang box, comprising:
    a main compartment having a front, a back, and a rectilinear front opening at the front;
    first securing structure around the front opening and facing the front, the securing structure adapted to secure the electrical control in the main compartment;
    a lower compartment extending below the main compartment and set back from the front of the main compartment, the lower compartment open to the main compartment along an upper extent thereof; and
    at least one generally vertically extending divider dividing the main compartment into at least two main compartments, each of the at least two main compartments sized and adapted to accept an electrical control, the at least one divider extending down from the main compartment into the lower compartment to divide the lower compartment into at least two lower compartments, the at least two lower compartments corresponding in position and extent to the at least two main compartments.

9. The electrical gang box of claim 8, wherein the at least one divider further comprises at least one opening, knockout, or flap therein.

10. The electrical gang box of claim 8, wherein each of the at least two main compartments further comprises at least one pair of rails, the at least one pair of rails aligned with one another, disposed on opposite interior walls.

11. The electrical gang box of claim 10, wherein each of the at least two main compartments further comprises at least two pairs of rails, each of the at least two pairs of rails spaced from one another vertically along the opposite interior walls.

12. The electrical gang box of claim 10, further comprising a generally horizontally-extending divider panel for each of the at least two main compartments, the divider panels sized to slide into and extend between the rails of the at least one pair of rails in each of the at least two main compartments, the divider panels having depths that are less than the depths of the at least two main compartments.

13. The electrical gang box of claim 8, further comprising openings or potential openings in one or more of the at least two main compartments or in one or more of the at least two lower compartments.

14. The electrical gang box of claim 13, wherein the potential openings comprise flaps in outer walls of the at least two main compartments that deflect to provide the openings.

15. The electrical gang box of claim 14, wherein the flaps provide strain relief for passing wires or cables.

16. An electrical gang box, comprising:
    a main compartment having a front, a back, and a rectilinear front opening at the front, the main compartment being sized and adapted to accept an electrical control;
    first securing structure around the front opening and facing the front, the securing structure adapted to secure the electrical control in the main compartment; and
    a lower compartment extending below the main compartment and set back from the front of the main compartment, the lower compartment open to the main compartment along an upper extent thereof;
    at least two pairs of rails,
        each pair of the at least two pairs of rails having first and second rails aligned with one another vertically and horizontally, disposed on opposite interior walls of the main compartment above and separate from a bottom of the main compartment, oriented to extend horizontally along a depth of the main compartment, and
        each of the at least two pairs of rails spaced vertically from others of the at least two pairs of rails along a height of the main compartment; and
    a divider panel sized to slide into and extend between the at least one pair of rails, the divider panel having a depth that is less than the depth of the main compartment.

17. The electrical gang box of claim 16, wherein the divider panel is divided by frangible score lines into two or more sections.

18. The electrical gang box of claim 16, further comprising second securing structure along an exterior surface of the gang box, the second securing structure adapted to secure the gang box to an exterior structure.

19. The electrical gang box of claim 16, further comprising openings or potential openings.

20. The electrical gang box of claim 19, wherein the potential openings comprise flaps in walls of the main compartment that deflect to provide the openings.

21. The electrical gang box of claim 20, wherein the flaps provide strain relief for passing wires or cables.

\* \* \* \* \*